Aug. 11, 1953 — R. K. CASSIDY — 2,648,545
CART FOR GOLF BAGS
Filed March 4, 1950 — 2 Sheets-Sheet 1
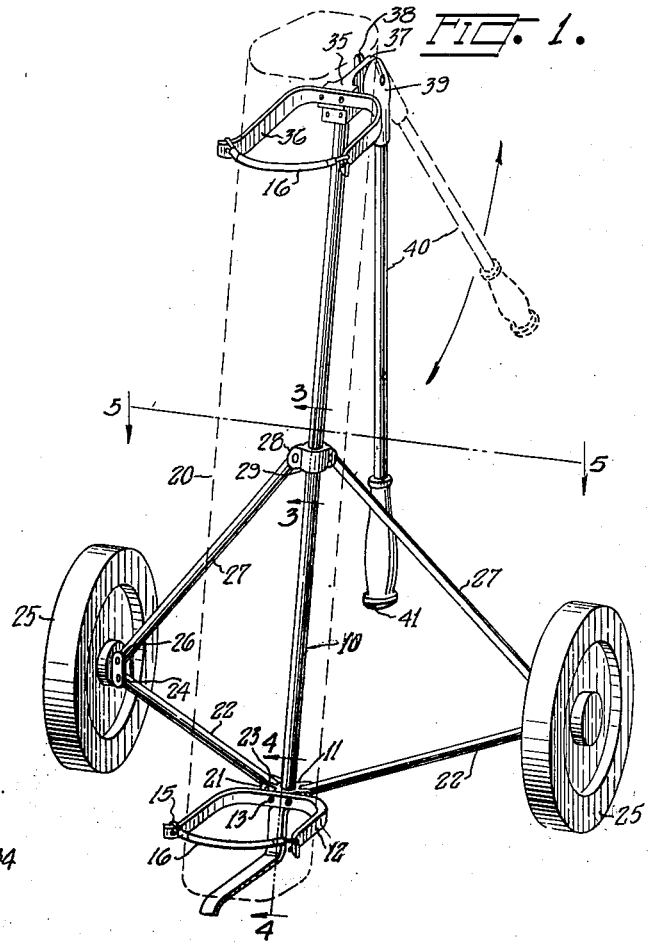
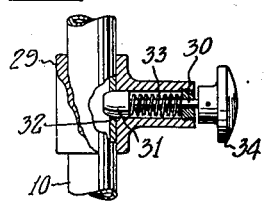
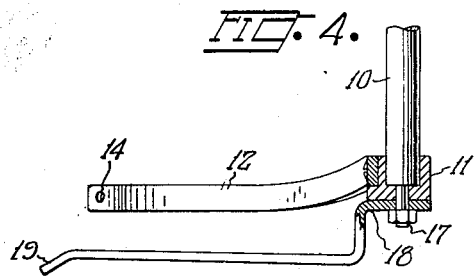
INVENTOR
ROBERT K. CASSIDY
ATTORNEY Aug. 11, 1953    R. K. CASSIDY    2,648,545
CART FOR GOLF BAGS
Filed March 4, 1950    2 Sheets-Sheet 2
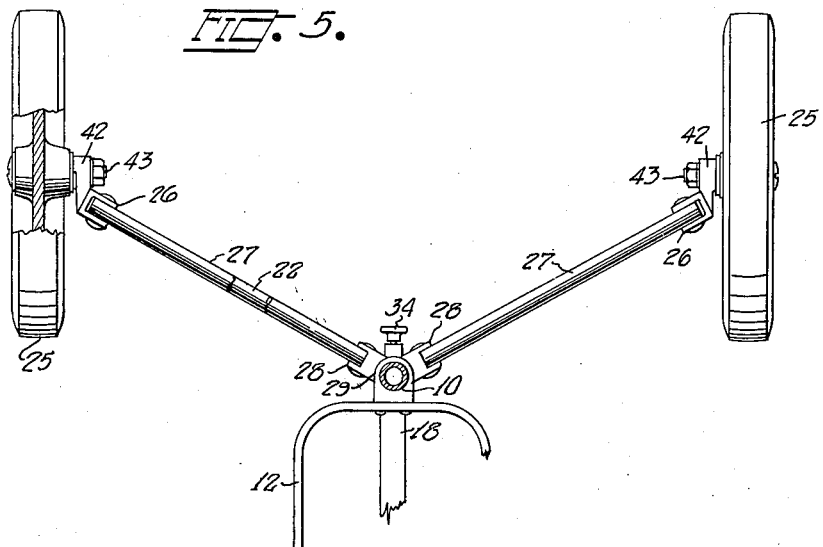
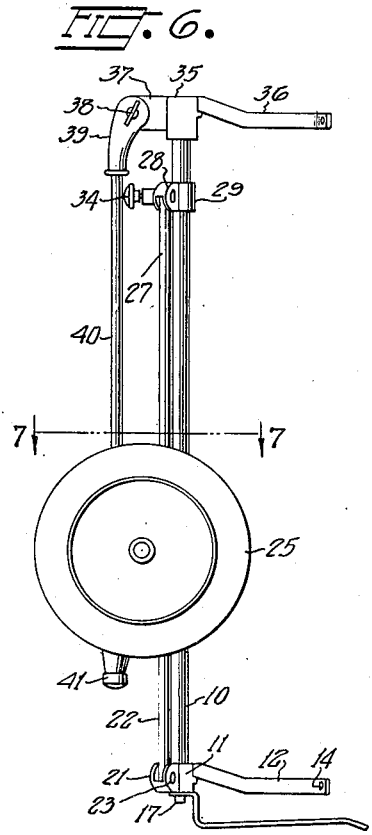
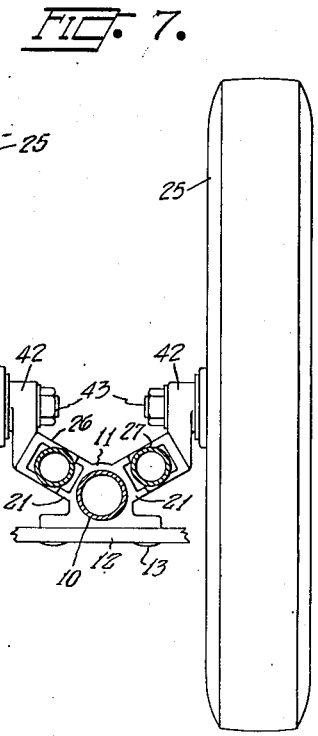
INVENTOR
ROBERT K. CASSIDY
BY
ATTORNEY Patented Aug. 11, 1953

2,648,545

UNITED STATES PATENT OFFICE 2,648,545

CART FOR GOLF BAGS

Robert K. Cassidy, Vancouver, Wash.

Application March 4, 1950, Serial No. 147,604

2 Claims. (Cl. 280—42)

The present invention comprises an improvement in carts for golf bags, having for its principal object the provision of a lightweight, inexpensive golf bag cart which will be within the reach of the average golfer in price.

A further object of the present invention is to provide a cart of the character described which will collapse to a minimum dimension with only a slight effort on the part of the operator. The present invention is distinguished from prior constructions of this type in that the cart comprises a pair of wheels mounted on movable rods which may be moved from inoperative positions closely adjacent and parallel to a frame shaft and in alignment with each other, to operative positions extending outwardly and rearwardly from the frame shaft, and in which the wheels are maintained in parallel operative relation to each other and may be moved to inoperative positions closely adjacent the frame shaft and in parallel relation to each other whereby the cart may be collapsed into a minimum amount of space and may be shipped in the smallest possible container. The present invention is distinguished from prior art constructions particularly in that the wheels, when in collapsed position, do not extend angularly outwardly from the frame shaft, nor are they positioned outwardly from the frame shaft in any respect except to a minimum extent.

The objects and advantages of the present invention may be more fully understood by reference to the accompanying drawings wherein like numerals refer to like parts throughout, and in which a preferred embodiment of the present invention is disclosed.

In the drawings,

Fig. 1 is a perspective view of the cart in operative position and showing the position of a bag mounted thereon in dash outline;

Fig. 2 is a detail view of an elastic bag retaining strap;

Fig. 3 is a fragmentary, sectional view taken substantially along line 3—3 of Fig. 1, at an enlarged scale, and illustrating the latch for maintaining the cart in collapsed or operative condition;

Fig. 4 is a fragmentary, vertical section taken substantially along line 4—4 of Fig. 1 and showing the construction of the lower bag retaining means and the foot;

Fig. 5 is a fragmentary, horizontal section taken substantially along line 5—5 of Fig. 1;

Fig. 6 is a side elevation of the cart in collapsed condition; and

Fig. 7 is a horizontal section, on an enlarged scale, taken substantially along line 7—7 of Fig. 6.

The cart comprises a frame shaft 10, which is preferably in the form of a length of tubing. A fixed rod mounting head 11 is fixed to the lower end of the frame shaft, and a U-shaped bag support 12 is secured to the forward surface thereof by means of screws 13. The forward extremities of the arms of the bag support 12 are provided with holes 14 which receive hooks 15 secured to the opposite ends of an elastic bag retaining strap 16. A bolt 17 extends axially downward from the lower end of the shaft 10 and through the fixed mounting head 11, the bolt projecting through an opening in the inner end of a foot 18 retained thereon by a nut threadedly mounted on the end of the bolt 17. The foot 18 comprises a downwardly and outwardly bent bar which extends forwardly midway between the arms of the bag support 12 and beyond the forward ends thereof to provide a support upon which the bottom of the bag is retained, and to provide a foot upon which the cart may rest in stable condition when tilted forwardly as seen in Fig. 1.

The fixed rod mounting head 11 comprises a pair of lower rod forks 21 which extend outwardly and rearwardly from the opposite sides of the frame shaft in equal acute angular relationship to a transverse plane including the axis of said frame shaft as an element, which plane is normal to a plane including the axis of the frame shaft 10 and the axis of the forwardly extending foot 19. A pair of lower rods 22 are respectively connected in said lower rod forks 21 by a pair of lower frame pivots 23 respectively extending normally to said lower rod forks. The rods 22 are thereby hingedly connected to the frame shaft 10 whereby they may be moved from inoperative, collapsed positions substantially parallel to and closely adjacent said frame shaft to extended operative positions extending rearwardly and outwardly from said frame shaft along the legs of the angle defined by said lower forks. The outer ends of the lower rods 22 are respectively pivotally connected in lower wheel forks 24 of a pair of wheel supporting members 42 in which are mounted bolts 43 comprising spindles for rotatably mounting ground-engaging wheels 25. Each of the wheel supporting members also comprises an upper wheel fork 26 in vertical alignment with the lower wheel fork 24. The wheel forks are at the extremities of forwardly extending portions of the wheel supporting members and in angular relation to the bolts 43, both wheel forks being positioned in equal acute angularity forwardly of a plane passing through the axes of the spindles and parallel to said first-mentioned plane when the wheels are in operative positions, the acute angularity thereof being equal to the first-mentioned acute angular relationship of the lower rod forks.

A pair of upper rods 27 are respectively pivotally connected in said upper wheel forks 26, the upper ends of the upper rods 27 being pivotally connected in upper rod forks 28 of a movable rod mounting head 29 which is slidably mounted on the frame shaft 10 above and in spaced relation to the fixed lower rod mounting head 11. The movable rod mounting head 29 is similar in shape to the fixed rod mounting head 11 and the forks 28 thereof extend rearwardly in the same angular direction as said lower rod forks. Accordingly, the upper rods 27 may move from a collapsed inoperative position closely adjacent to and parallel to the frame shaft 10 and in substantial alignment with the lower rods 22 when in collapsed position, to operative positions extending rearwardly and outwardly from said frame shaft along the legs of the angle defined by said upper rod forks. Portions of the ends of the lower rods 22 and of the ends of the upper rods 27 engage cooperative portions of the wheel supporting members when the rods are in extended operative positions so as to maintain the wheels in parallel relationship to each other with the wheel spindles lying along a common axis. When the rods are moving toward inoperative collapsed position the wheels may assume various nonrelated positions with respect to each other, but when the rods are drawn to their fully collapsed position the normal tendency of the wheels is to assume parallel relationship to each other as shown in Fig. 7. The wheels are movable into parallel relation to each other and will be drawn inwardly closely adjacent the frame shaft 10 whereby the cart may be stowed in a very small space and may be packed in a minimum-dimensioned carton.

The angle between the upper frame forks 28 is substantially bisected by a tubular projection extending normally to the axis of the frame shaft 10 and having an axial opening therethrough in which is slidably mounted a plunger 30 having a latching point 31 on its inner end. The latching point 31 is urged into latching engagement with either of a pair of latching openings 32 in the surface of the shaft 10, one such opening being provided at a lower point substantially midway of the shaft for engagement with the latching point when the wheels are in extended operative position, and another such opening being provided at an upper point to retain the wheels in collapsed position as seen in Fig. 7. A spring 33 is suitably retained in compression about the plunger 30 and urges the latching point 31 inwardly, and a manually engageable head 34 is pinned to the outer end of the plunger 30 whereby the latching point may be withdrawn. The projection mounting the latch comprises a convenient handle by means of which the slidable upper rod mounting head may be moved along the frame shaft 10, the operator being able to use the same hand to withdraw the latch and slide the head. During movement of the slidable head from its extreme positions the latching point slides on the surface of the frame shaft, and will automatically snap into the appropriate latching opening.

A handle mounting head 35 is suitably mounted on the upper extremity of the frame shaft 10, and a U-shaped upper bag support 36, similar to the lower bag support 12, is mounted thereon in alignment with the bag support 12, the forward ends of the arms thereof retaining a bag retaining strap 16 as previously described. An arm 37 integral with the head 35 extends rearwardly therefrom and pivotally supports a rearwardly extending clamp member 39 by means of a screw and wing nut 38. The clamp member supports a handle rod 40 which may be swung from an inoperative position substantially parallel to and alongside of the frame shaft 10 between the wheels 25 as seen in Fig. 6 to an operative, rearwardly extending position as indicated by the arrows and dash outline in Fig. 1. The handle rod 40 is preferably provided with a rubber handgrip 41.

Having illustrated and described a preferred embodiment of the invention, it should be apparent to those skilled in the art that the same permits of modification in detail. All such modifications as come within the true spirit and scope of the following claims are considered to be a part of my invention.

I claim:

1. A golf cart comprising an elongated, bag-supporting frame shaft, a rearwardly extending handle hingedly mounted on the upper end of said frame shaft, forwardly extending bag-supporting means mounted on said frame shaft, a fixed rod mounting head fixed to the lower end of said frame shaft and comprising a pair of lower rod forks extending in equal, acute angular relationship rearwardly of a transverse plane including the axis of said frame shaft as an element, a pair of lower rod pivots respectively extending normally to said lower rod forks, a similarly shaped, movable rod mounting head slidably mounted on said frame shaft above said fixed rod mounting head and comprising a pair of upper rod forks extending in the same angular relationship as said lower rod forks, a pair of upper rod pivots respectively extending normally to said upper rod forks and parallel to said lower rod pivots, a pair of lower rods respectively connected in said lower rod forks by said lower rod pivots, said lower rods being movable from collapsed positions substantially parallel to and closely adjacent said frame shaft to operative positions extending rearwardly and outwardly from said frame shaft along the legs of the angle defined by said lower rod forks, a pair of upper rods respectively connected in said upper rod forks by said upper rod pivots, said upper rods being movable from collapsed positions substantially parallel to and closely adjacent said frame shaft in alignment with said lower rods to operative positions extending rearwardly and outwardly from said frame shaft along the legs of the angle defined by said upper rod forks, a pair of wheel supporting members, a pair of wheel spindles respectively mounted on said wheel supporting members in outwardly extending relation thereto, said wheel supporting members each comprising a lower wheel fork and an upper wheel fork, said wheel forks extending toward said frame shaft in equal acute angular relationship forwardly of a plane passing through the axes of said spindles and parallel to said first-mentioned plane when said rods are in operative positions, the acute angularity thereof being equal to the first-mentioned acute angularity, means pivotally connecting the respective outer ends of said lower rods within said lower wheel forks and the outer ends of said upper rods within said upper wheel forks, a pair of wheels rotatably mounted respectively on said wheel spindles, means to latch said movable rod mounting head at a lower operative position along said frame shaft when said rods are in their operative position and said wheels are in ground engaging position, and to latch said movable rod mounting head at an upper position along said frame shaft when said rods are in their collapsed position and said wheels are drawn to inoperative positions closely adjacent and parallel to said frame shaft with said wheel spindles in axial alignment with each other.

2. A golf cart comprising an elongated, bag-supporting frame shaft, a rearwardly extending handle hingedly mounted on the upper end of said frame shaft, forwardly extending bag-supporting means mounted on said frame shaft, a fixed rod mounting head fixed to the lower end of said frame shaft and comprising a pair of lower rod forks extending in equal, acute angular relationship rearwardly of a transverse plane including the axis of said frame shaft as an element, a pair of lower rod pivots respectively extending normally to said lower rod forks, a similarly shaped, movable rod mounting head slidably mounted on said frame shaft above said fixed rod mounting head and comprising a pair of upper rod forks extending in the same angular relationship as said lower rod forks, a pair of upper rod pivots respectively extending normally to said upper rod forks and parallel to said lower rod pivots, a pair of lower rods respectively connected in said lower rod forks by said lower rod pivots, said lower rods being movable from collapsed positions substantially parallel to and closely adjacent said frame shaft to operative positions extending rearwardly and outwardly from said frame shaft along the legs of the angle defined by said lower rod forks, a pair of upper rods respectively connected in said upper rod forks by said upper rod pivots, said upper rods being movable from collapsed positions substantially parallel to and closely adjacent said frame shaft in alignment with said lower rods to operative positions extending rearwardly and outwardly from said frame shaft along the legs of the angle defined by said upper rod forks, a pair of wheel supporting members, a pair of wheel spindles respectively mounted on said wheel supporting members in outwardly extending relation thereto, said wheel supporting members each comprising a lower wheel fork and an upper wheel fork, said wheel forks extending toward said frame shaft in equal acute angular relationship forwardly of a plane passing through the axes of said spindles and parallel to said first-mentioned plane when said rods are in operative positions, the acute angularity thereof being equal to the first-mentioned acute angularity, means pivotally connecting the respective outer ends of said lower rods within said lower wheel forks and the outer ends of said upper rods within said upper wheel forks, a pair of wheels rotatably mounted respectively on said wheel spindles, and means to latch said movable rod mounting head at a lower operative position along said frame shaft when said rods are in their operative positions or at an upper position when said rods are in their collapsed positions comprising a rearwardly extending protuberance on said movable rod mounting head, a plunger slidably mounted in said protuberance and including a manually engageable head, said plunger extending normally to the axis of said frame shaft, a spring normally biasing said plunger inwardly toward said frame shaft, and a longitudinally spaced pair of openings in said frame shaft in which said plunger may be alternately engaged to maintain said wheels in operative or collapsed positions.

ROBERT K. CASSIDY.

References Cited in the file of this patent

UNITED STATES PATENTS

| Number | Name | Date |
|---|---|---|
| 2,228,046 | Bird | Jan. 7, 1941 |
| 2,414,017 | Carr et al. | Jan. 7, 1947 |
| 2,518,803 | Marvin | Aug. 15, 1950 |
| 2,579,937 | Larsen | Dec. 25, 1951 |